United States Patent [19]
Albright

[11] 3,874,432
[45] Apr. 1, 1975

[54] TREE HARVESTING APPARATUS
[75] Inventor: Alva Z. Albright, Pineville, La.
[73] Assignee: Al Albright, Inc., Pineville, La.
[22] Filed: June 12, 1973
[21] Appl. No.: 369,363

[52] U.S. Cl. .................. 144/34 R, 83/928, 83/795, 144/3 D, 30/381, 30/379.5
[51] Int. Cl. ...................... A01g 23/08, B27b 17/02
[58] Field of Search ............... 144/34 R, 34 A, 3 D; 30/381–385; 83/795, 928

[56] References Cited
UNITED STATES PATENTS
| | | | |
|---|---|---|---|
| 1,276,579 | 8/1918 | Scott | 30/382 |
| 3,565,138 | 2/1971 | Albright | 144/34 R |
| 3,672,412 | 6/1972 | Albright | 144/34 A |

Primary Examiner—Donald R. Schran
Attorney, Agent, or Firm—James B. Lake, Jr.

[57] ABSTRACT

A rectangular saw bar is pivotally mounted in a hollow anvil having a rectangular base and a forward projection in extension of a side of said base. The saw bar is adapted to pivot from wholly within said base to partially into said projection which receives therewith a cutting run of a chain saw mounted for rotation around the saw bar. A wedge is mounted on the saw bar for tilting large trees, said wedge extending oppositely but parallel to the cutting run side. A pusher is pivoted to a bracket fixed at the intersection of the base and projection and adapted to pivot from a horizontal position covering an open end of said base to an upright position normal to said projection. A pusher bar is rigidly fixed on the pusher at its free end to extend normal thereto and parallel to said projection. A plurality of gripper rings with sharpened and tapering peripheries are mounted concentrically on the pusher bar, which in combination engage a standing tree when the pusher is pivoted upward, thereby uncovering the open end of said base for the pivoting of the saw bar and chain saw to cut the tree. The pusher bar pushes the tree, as it is cut, in the same direction as the wedge as it enters the cut being made, thus felling the tree when severed clear of the machine and operator.

3 Claims, 7 Drawing Figures

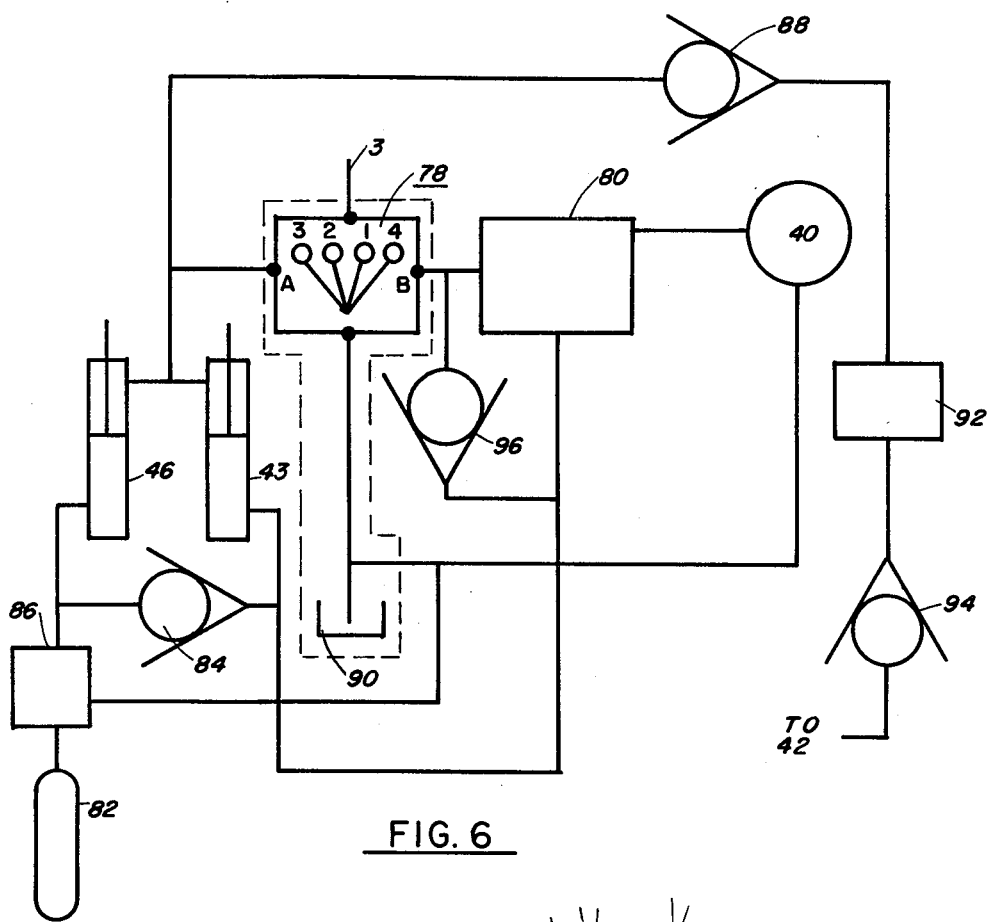
FIG. 6
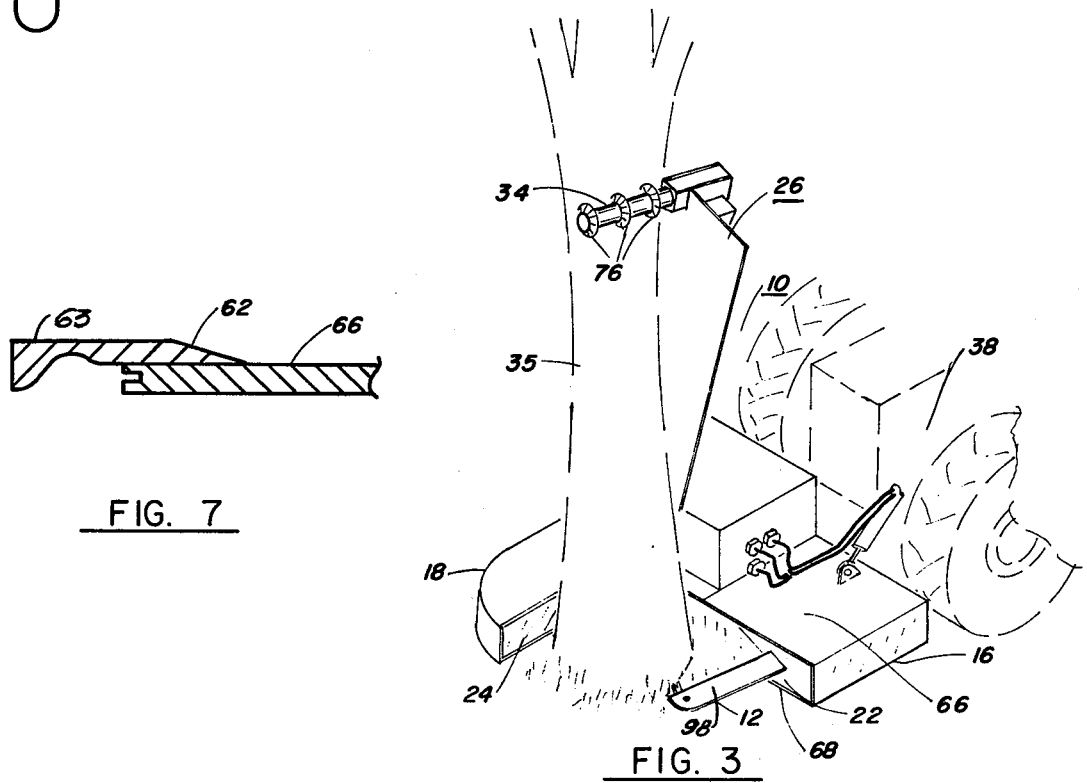
FIG. 7
FIG. 3

TREE HARVESTING APPARATUS

The invention relates to tree harvesters and more particularly to improved tree cutting and directional felling apparatus.

This invention is an improvement of my invention disclosed and patented Feb. 23, 1971 by U.S. Pat. No. 3,565,138 for Apparatus and Method for Felling Trees.

An object of the invention is to provide safer and more undamageable directional tree felling apparatus.

Figure 1:
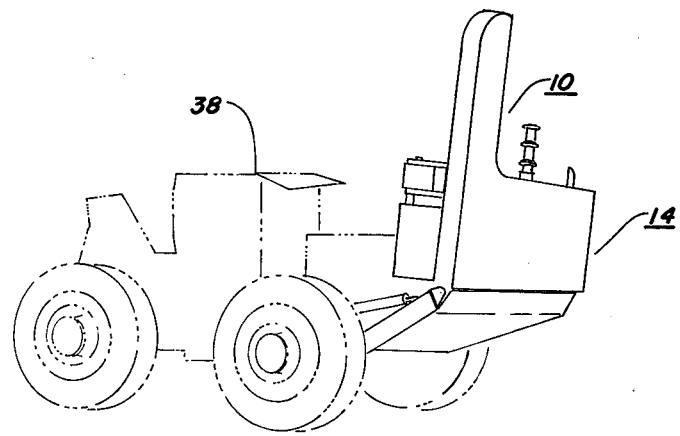
Figure 2:
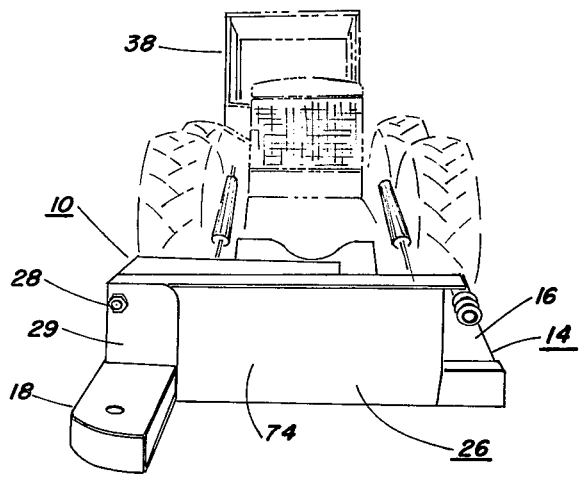
Figure 4:
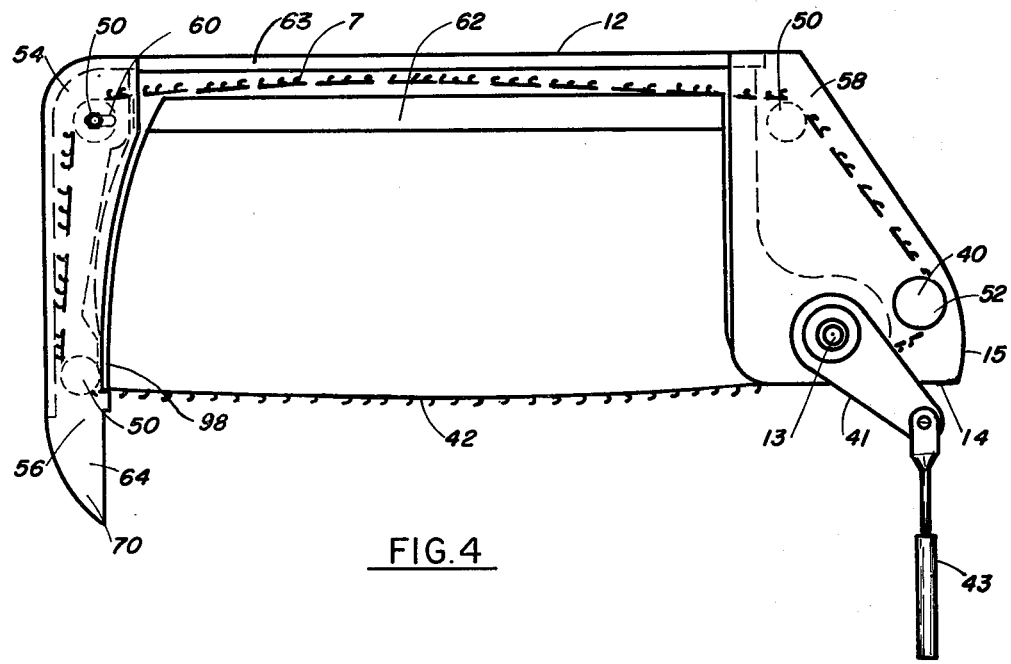
Figure 5:
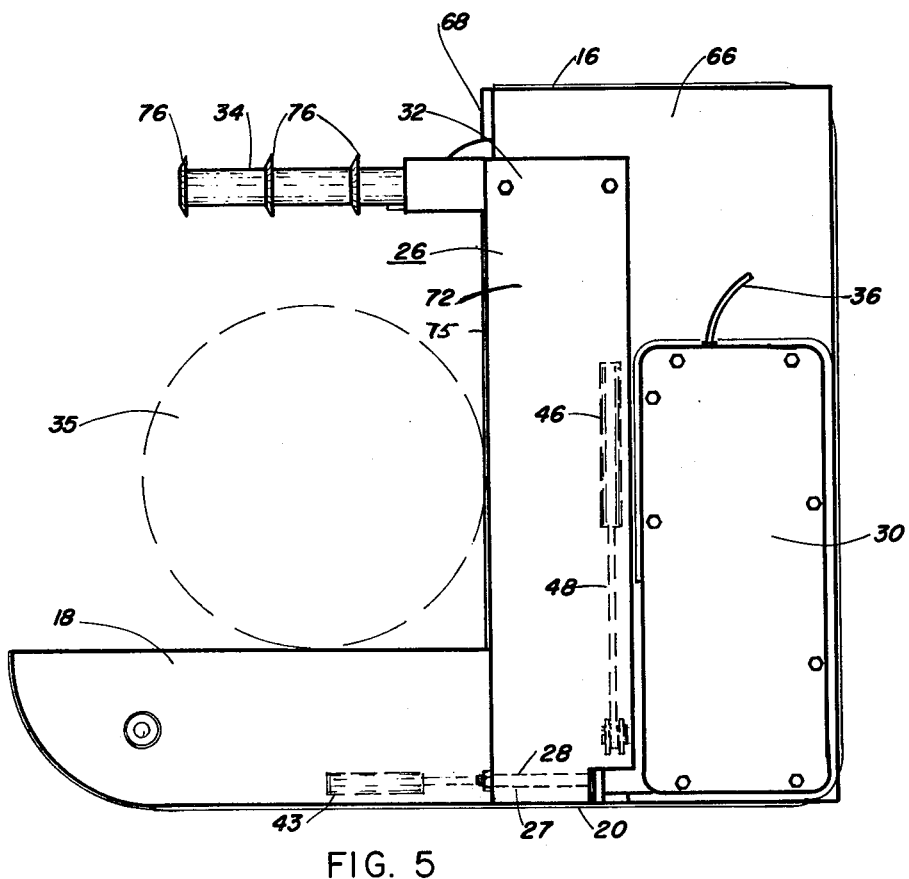

Other objects and a more complete understanding of the invention may be had by referring to the following description, claims and drawings in which:

FIG. 1 is a perspective view of the invention shown mounted on a power train in transporting condition, FIG. 2 is similar to FIG. 1 but with the invention in an approach condition to a tree to be felled, FIG. 3 is similar to FIGS. 1 and 2 but with the invention in the process of felling a tree, FIG. 4 is a plan view of the saw bar and chain saw of the invention, FIG. 5 is a plan view of the invention in approach condition with tree positioned for cutting indicated by dashed circle and hydraulic activating apparatus indicated by dashes, FIG. 6 is a schematic diagram of hydraulic control and actuating systems of the invention, and FIG. 7 is a cross-sectional view along section lines 7—7 of FIG. 4.

Referring to FIGS. 1–5, the invention 10 comprises a saw bar 12 of modified rectangular shape pivotally mounted in a hollow anvil 14 by a pivot 13 fixto a corner 15 of the saw bar. The anvil 14 comprises a rectangular base 16 and a forward projection 18 in extension of a side 20 of base 16. The saw bar 12 is adapted to pivot from within anvil base 16 through an open end 22 thereof to partially enter in an open side 24 of projection 18. A pusher 26 is pivoted at an end 27 by a pivot shaft 28 to a bracket 29 fixed at the intersection of base 16 with projection 18 adjacent side 20, and to a control box 30 mounted on top of base 16. Pusher 26 is an elongated structure having oppositely disposed ends 27 and 32 and is adapted to pivot around pivot shaft 28 from a horizontal position covering open end 22 to an upright position normal to base 16 and its adjacent side 20. A pusher bar 34 is fixed to the free end 32 of pusher 26 and normal thereto for engaging a standing tree 35 (see FIG. 5) positioned between base 16 and projection 18 when pusher 26 rises from a horizontal position. Hydraulic power lines 36 connect an hydraulic power supply of an associated power train 38, to the front of which invention 10 is mounted, to control box 30 where hydraulic pressure fluid is distributed to a motor 40 for driving a chain saw 42 in rotation around saw bar 12 through a fixed link 41, to an hydraulic cylinder 43 mounted in base 16 fith its piston rod 44 pivoted to saw bar 12 for swinging saw bar 12 around its pivot 13, and to an hydraulic cylinder 46 mounted in pusher 26 with its piston rod 48 pivoted to base 16 for pivoting pusher 26 around its pivot shaft 28.

Referring to FIG. 4, saw bar 12 mounts three idler sprockets 50 and a driven sprocket 52 respectively mounted at the corners of the saw bar. Two idlers 50 are mounted for rotation on corners 54 and 56, the third idler 50 is similarly mounted at a corner 58 and the driven sprocket 52 is mounted at corner 15. Chain saw 42 is mounted for clockwise rotation around the sprockets with the cutting run between corners 15 and 56 with the chain saw extending beyond the perimeter of the saw bar therebetween, and with the chain saw running within the perimeters between other corners. Idler sprocket 54 is pivoted in a slotted hole 60 for adjusting tension of chain saw 42. A wedge 62 is fixed to the side of the saw barbetween corners 54 and 58 and tapered toward the opposite side between corners 15 and 56. A back 63 of the wedge extends outwardly and downwardly beyond the mounting side for protecting a back run of the chain saw. The increased number and arrangements of sprockets on the saw bar reduces overall friction and heat of operation as compared with a one sprocket saw bar. The modified rectangular shape and the additional sprockets makes it possible to run the chain saw clockwise to throw sawdust, trash etc. away from the equipment. A saw bar lock and stop 64 extends outwardly from and normal to corner 56 of the saw bar for engagement in and with the outboard end of open side 24 of projection 18 when the saw bar is partially engaged therein.

Anvil base 16 comprises a hollow rectangular structure having an open side 22 defined between upper and lower anvil plates 66 and 68. The lower anvil plate 68 defining a side of opening 22 extends outwardly beyond upper plate 66 in order that lower plate 68 will engage a tree to be cut and not pusher 26 which would bind against the tree and against rising.

Anvil projection 18 comprises a hollow elongated structure having an open side 24 and a side tapered end 70 shaped to conform with saw bar lock and stop 64 and cooperate therewith to support the extended end of the saw bar and prevent the cutting run of the chain saw from too far an entrance into open side 24.

Pusher 26 comprises an elongated structure, angular in transverse cross-section, and having, when horizontal, ana upper plate 72 that shields its actuating hydraulic cylinder 46, and a depending plate 74 that covers open side 22 of base 16, but which does not project beyond the leading edge 75 of lower anvil plate 68. Gripper rings 76 having radially outward tapered peripheries are concentrically fixed in spaced relationship on pusher bar 34, with respective tapers facing outward from pusher 26. The gripper rings are adapted to bite into a standing tree to prevent it from outwardly from pusher 26 when engaged on its remaining three sides by base 16, projection 18 and saw bar 12.

Referring to FIG. 6, the schematic diagram, the parts enclosed in dot-dash lines are mounted on the power train 38 and the rest of parts are mounted in the tree harvesting apparatus attached to the front of the power train. A description the parts will be included in the following description of the operation of the invention.

To operate the invention, a control valve 78 is set to a position designated 3. In this setting hydraulic pressure fluid from a pressure side of the hydraulic power supply flows from port "B" to a flow divider 80 which can be set to determine the speed at which saw bar 12 will advance through a tree. A controlled flow from the divider goes to can end hydraulic cylinder 43 to pivot saw bar 12 with its chain saw 42 between open side 22 to open side 24. When at any time the pressure between hydraulic cylinder 46 and an accumulator 82 actuating said cylinder is less than pressure required to actuate hydraulic cylinder 43, pressure fluid will pass through check valve 84 and increase pressure on can end of cylinder 46. This pressure increases until cylinder 43 is reactivated or until an engaged tree is pushed over or pressure relief valve 86 is actuated. The remainder of flow from flow divider 80 goes to hydraulic motor 40 for rotating chain saw 42 on its saw bar 12. From the motor most of the hydraulic fluid flows through check valve 88, through port A back to reservoir or tank 90. A small amount of hydraulic fluid from the motor flows through an adjustable needle valve 92 and through an adjustable check valve 94, which is set at a suitable pressure to keep the system from leaking or siphoning when motor is not pressurized, and then to chain saw 42 for lubricating purposes and is lost to the system.

The sawing and felling of a tree being completed in position 3, the control valve is set to position 1. In this setting hydraulic pressure fluid flow flows through port A and is blocked by check valve 88 and directed to rod ends of hydraulic cylinders 43 and 46 which act respectively to retract saw bar 12 first, followed by retraction of pusher 26 which is delayed by the counter pressure of the accumulator. It is important that retraction of saw bar 12 and chain saw 42 be swift and for this reason a check valve 96 bypasses fluid divider 80 in order that return to reservoir 90 is always wide open for the can end of hydraulic cylinder 43. Relief valve 86 can be set for automatic operation, and can be operated by solenoid or manually in case of severe overload such as a tree collapsing pusher 26, since opening the relief valve allows the pusher to retract.

After the saw bar and pusher are fully retracted in setting 1, control valve 78 is set to position 2. In this setting, which is normal when not cutting or recovering therefrom, both ports "A" an "B" are closed and the accumulator is held charged for the next cutting cycle.

Control valve 78 setting 4 provides for raising pusher 26 over the condition of setting 2 of the invention. It is used to introduce a pushing force into parts other than the saw bar.

In operation as described above, the invention cuts trees which are pushed in felling away from the invention, its associated power train and the operator thereof. To assist in the pushing wedge 62 engages in a cut of the chain saw as it is made in the last stages of cutting to tilt the tree in the direction of pushing. A built-up edge or side 98 of the saw bar between corners 54 and 56 and best shown in FIGS. 3 and 4, prevents the cut tree from kicking off that edge or side. The rectangular shape of the saw bar, reinforced on three of its sides by wedge 62 and rear extension 63, built up edge 98, and an angled built-up edge between corners 15 and 50, is a strength member tieing the base and projection together in locked combination of mutually supporting elements capable of supporting a cut tree and being undamageable by the falling of the cut tree. The built-up edge or side 98 may comprise reinforcing plates mounted and secured in place on the saw bar.

I claim:

1. Improved tree harvesting apparatus for use with a power train having an auxiliary power supply, said apparatus having a hollow anvil with a rectangular base and a projection adjacent a side thereof which extends normal to said base in a common horizontal plane, the angle therebetween being defined by open sides, and said apparatus comprising: a modified rectangular saw bar, having oppositely disposed leading and back edges and opposite ends, pivotally mounted in said base by a pivot defined adjacent said leading edge and one of said opposite ends, for pivoting in said common horizontal plane from wholly within said base to partially into said projection through said open sides and the right angle therebetween, said saw bar defining at the other of said opposite ends a stop and lock extending normal to said leading edge and conformed in shape to a free end of the projection for limiting movement of said saw bar therein, said saw bar also having a wedge fixed on the back edge thereof and parallel to said leading edge for providing a wedging action therewith; a chain saw mounted for rotation around said saw bar with a cutting run on the leading edge thereof as it pivots from said base into said projection; pusher means pivotally mounted on said base adjacent intersection with said projection for pivoting from a parallel position therewith to an upright position adjacent said projection to thereby bias a tree positioned between said base and projection toward said projection; actuating means operatively connected to said auxiliary power supply and mounted respectively adjacent said saw bar, pusher means and chain saw for respectively pivoting said saw bar, pusher means and rotating said chain saw around the saw bar; and power control means mounted in said power train and on said hollow anvil and connected between said auxiliary power supply and the actuating means for the coordinated application of the power supply to said actuating means to fell trees.

2. Improved harvesting apparatus as described in claim 1 wherein said pusher means comprises: an elongated structure, angular in cross-section, pivoted to said base with a depending side adapted to cover said open side of said base when said pusher means is in horizontal position; a pusher bar mounted on the free end of said pusher means and normal thereto for engaging a tree positioned in the right angle between said base and projection as the pusher means rise to an upright position; and gripper rings mounted in spaced concenticity on said pusher bar for engaging tree against falling in the direction of its unsupported side.

3. Improved harvesting apparatus as described in claim 1 wherein said rectangular saw bar comprises: reinforcing plates mounted on edges adjoining said leading edge of said rectangular saw bar for strengthening said saw bar and in combination with said wedge mounted on another edge strengthens said saw bar for supporting a cut tree; and a lock in combination with said stop and mounted therewith normal to said leading edge of the rectangular saw bar and adapted to enter the free end of the projection with said stop for tieing said harvesting apparatus together against piecemeal damage during the falling of a cut tree.

* * * * *